(12) United States Patent
Kamiki

(10) Patent No.: US 8,344,567 B2
(45) Date of Patent: Jan. 1, 2013

(54) ROTATING ELECTRICAL MACHINE

(75) Inventor: Yasuaki Kamiki, Fukuoka (JP)

(73) Assignee: Kabushiki Kaisha Yaskawa Denki, Kitakyushu-Shi (JP)

( * ) Notice: Subject to any disclaimer, the term of this patent is extended or adjusted under 35 U.S.C. 154(b) by 102 days.

(21) Appl. No.: 12/959,388

(22) Filed: Dec. 3, 2010

(65) Prior Publication Data

US 2011/0227437 A1    Sep. 22, 2011

(30) Foreign Application Priority Data

Mar. 16, 2010  (JP) ................. 2010-059770

(51) Int. Cl.
*H02K 7/20*     (2006.01)
*H02K 17/44*    (2006.01)
*H02K 47/00*    (2006.01)
*H02K 47/14*    (2006.01)
*H02K 16/00*    (2006.01)

(52) U.S. Cl. ... 310/112; 310/113; 310/114; 310/154.33; 310/156.36; 310/410; 310/266

(58) Field of Classification Search .......... 310/112–114, 310/154.33, 156.36, 410, DIG. 2; H02K 7/20, H02K 17/44, 47/00, 47/14, 16/00
See application file for complete search history.

(56) References Cited

U.S. PATENT DOCUMENTS

| | | | | |
|---|---|---|---|---|
| 2,006,172 | A | * | 6/1935 | Klappauf .................. 310/166 |
| 5,528,094 | A | * | 6/1996 | Hasebe et al. ............. 310/112 |
| 5,783,892 | A | | 7/1998 | Kanzaki et al. |
| 7,615,903 | B2 | * | 11/2009 | Holmes et al. ............. 310/90 |
| 2004/0095037 | A1 | * | 5/2004 | Palmero .................. 310/261 |
| 2004/0135465 | A1 | * | 7/2004 | Smith et al. .............. 310/268 |
| 2006/0082238 | A1 | * | 4/2006 | Kusase et al. ............ 310/166 |
| 2007/0252462 | A1 | * | 11/2007 | Holmes et al. ............ 310/112 |
| 2009/0051239 | A1 | * | 2/2009 | Kinoshita et al. .......... 310/152 |

FOREIGN PATENT DOCUMENTS

| | | |
|---|---|---|
| EP | 0871277 | 10/1998 |
| JP | 55-61255 | 5/1980 |
| JP | 09-098550 | 4/1997 |
| JP | 2002-281721 | 9/2002 |
| JP | 2003-276971 | 10/2003 |

OTHER PUBLICATIONS

Japanese Office Action for corresponding JP Application No. 2010-059770, Jul. 27, 2012.

* cited by examiner

*Primary Examiner* — Quyen Leung
*Assistant Examiner* — Terrance Kenerly
(74) *Attorney, Agent, or Firm* — Ditthavong Mori & Steiner, P.C.

(57) ABSTRACT

A rotating electrical machine includes a flange provided at one end of a hollow frame in an axial direction; a rotor including a shaft, the shaft being rotatably supported by the flange; and a stator fixed to an inner section of the frame, the stator surrounding the rotor. The rotor includes a first rotor core and a second rotor core arranged in the axial direction and having recesses formed in the axial direction, and a rotor-core space defined by the recesses that are formed in the first rotor core and the second rotor core and that face each other.

15 Claims, 5 Drawing Sheets

ROTATING ELECTRICAL MACHINE

CROSS-REFERENCE TO RELATED APPLICATION

The present application claims priority under 35 U.S.C. §119 to Japanese Patent Application No. 2010-059770, filed Mar. 16, 2010. The contents of the application are incorporated herein by reference in their entirety.

BACKGROUND OF THE INVENTION

1. Field of the Invention

The present invention relates to rotating electrical machines.

2. Discussion of the Background

Japanese Unexamined Patent Application Publication No. 2002-281721 discloses a rotating electrical machine suitable for use as a large-capacity rotating electrical machine. The rotating electrical machine has a combination of the number of poles and the number of coils suitable for using the rotating electrical machine as a permanent magnet synchronous motor. Accordingly, an induced voltage waveform is close to a sine wave, and the amplitude of a cogging torque is reduced so that the required skew angle can be reduced. Therefore, even when the capacity of the rotating electrical machine is increased, the influence of unbalanced attractive force is small.

SUMMARY OF THE INVENTION

According to one aspect of the present invention, a rotating electrical machine includes a flange provided at one end of a hollow frame in an axial direction; a rotor including a shaft, the shaft being rotatably supported by the flange; and a stator fixed to an inner section of the frame, the stator surrounding the rotor. The rotor includes a first rotor core and a second rotor core arranged in the axial direction and having recesses formed in the axial direction, and a rotor-core space defined by the recesses that are formed in the first rotor core and the second rotor core and that face each other.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1:
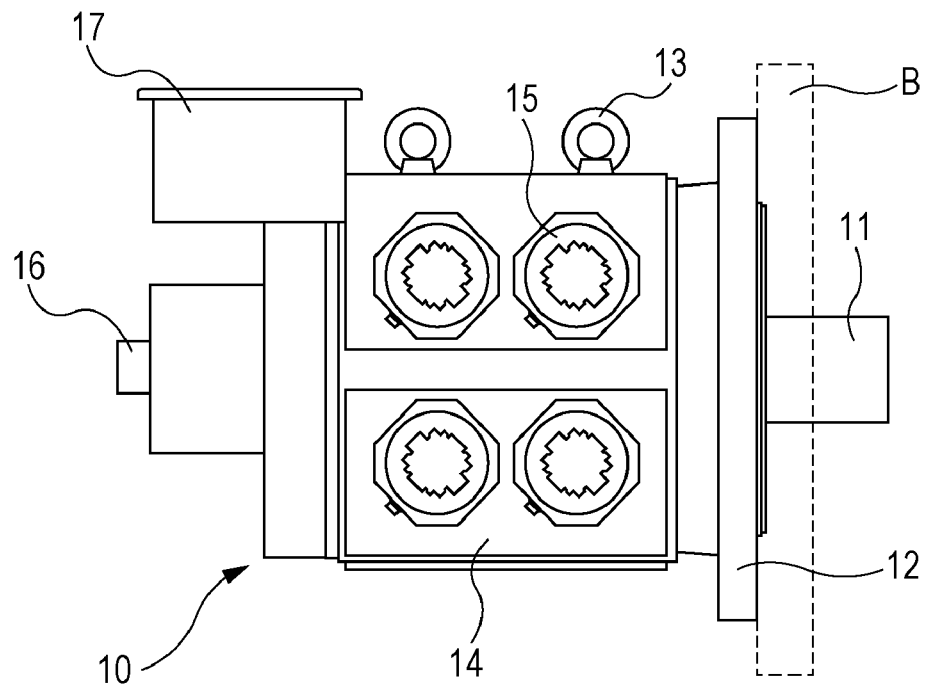
FIG. 1 is a side view of a rotating electrical machine.

The external structure of a rotating electrical machine 10 according to an embodiment of the present invention will be described with reference to FIGS. 1 and 3. FIG. 1 is a side view of the rotating electrical machine 10, FIG. 2 is a front view of the rotating electrical machine 10, and FIG. 3 is a top view of the rotating electrical machine 10.

Figure 2:
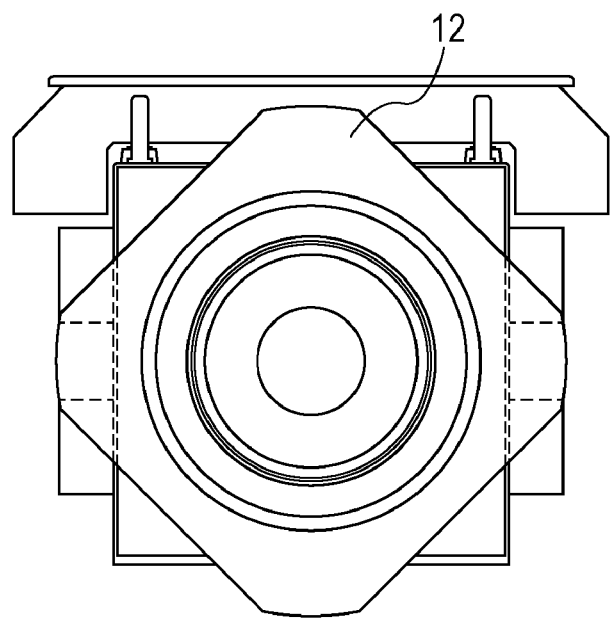
FIG. 2 is a front view of the rotating electrical machine.
Figure 3:
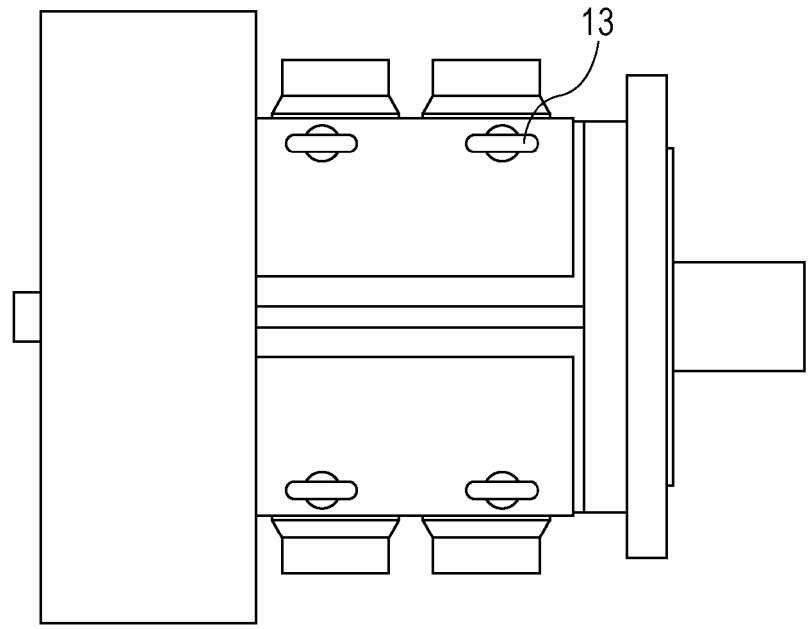
FIG. 3 is a top view of the rotating electrical machine.

Referring to FIGS. 1 to 3, the rotating electrical machine 10 is a large motor having an extremely high output. The rotating electrical machine 10 is fixed with bolts (not shown) to a bracket B with a plate-shaped flange unit 12 provided therebetween. The rotating electrical machine 10 is fixed such that a shaft 11 extends horizontally. Four rings 13 for suspending the rotating electrical machine 10 with a crane are provided at the top of the rotating electrical machine 10. A surface of the rotating electrical machine 10 is covered by a cover 14, and four cooling fans 15 are provided at each side of the rotating electrical machine 10. An encoder unit 16 that controls the position and speed of the motor is provided at the back of the rotating electrical machine 10. A connector unit 17 through which power is supplied is provided above the encoder unit 16.

The fans 15 are provided at the opposite sides of the rotating electrical machine 10 so as to face each other in a plan view of the rotating electrical machine 10 as viewed in an axial direction of the shaft 11.

Internal Structure of Rotating Electrical Machine 10

Figure 4:
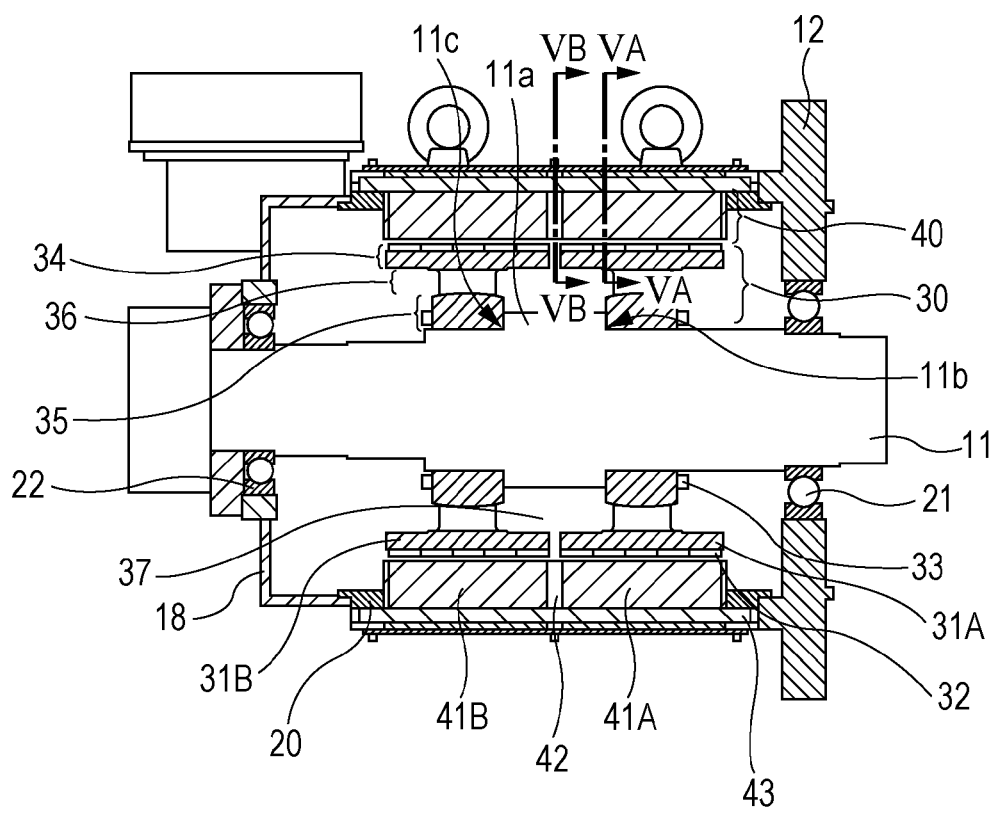
FIG. 4 is a side sectional view of the rotating electrical machine.

The internal structure of the rotating electrical machine 10 will now be described with reference to FIG. 4. FIG. 4 is a side sectional view of the rotating electrical machine 10. The shaft 11 is provided so as to extend through a rotating shaft of the rotating electrical machine 10 in the axial direction. The rotating electrical machine 10 includes the flange unit 12 at one end of a substantially rectangular, hollow frame 20 in the axial direction. The rotating electrical machine 10 also includes a lid unit 18 at the other end of the frame 20 in the axial direction. The shaft 11 is rotatably supported by bearings 21 and 22 provided on the flange unit 12 and the lid unit 18, respectively.

Structure of Rotor Unit 30

A rotor unit 30 is fixed to the shaft 11. The rotor unit 30 rotates together with the shaft 11. The rotor unit 30 includes a first rotor core 31A and a second rotor core 31B. The first rotor core 31A and the second rotor core 31B are arranged next to each other in the axial direction. Magnets 32 are provided on the outer peripheral surfaces of the first rotor core 31A and the second rotor core 31B. The magnets 32 are permanent magnets. The shaft 11 has a shape including step portions having different outer diameters. A rotor-core attachment portion 11a is provided at a central section of the shaft 11 in the axial direction, where the outer diameter of the shaft 11 is the largest. The rotor cores 31A and 31B are fixed with bolts 33 to rotor-core attachment surfaces 11b and 11c, respectively, which are side surfaces of the rotor-core attachment portion 11a in the axial direction. The method for fixing the rotor cores 31A and 31B is not particularly limited, and the rotor cores 31A and 31B may instead be fixed using keys, spannrings, or the like.

The rotor cores 31A and 31B include rotor-core outer peripheral portions 34 to which the magnets 32 are attached, rotor-core inner peripheral portions 35 at which the rotor cores 31A and 31B are attached to the rotor-core attachment portion 11a, and rotor-core central portions 36 that connect the rotor-core outer peripheral portions 34 to the rotor-core inner peripheral portions 35. The rotor-core outer peripheral portions 34 are shaped so as to protrude from both sides of the rotor-core central portions 36 in the axial direction. Thus, the first rotor core 31A and the second rotor core 31B have recesses formed in the axial direction.

The rotor unit 30 is provided with a rotor-core space 37 that is defined mainly by the rotor-core outer peripheral portions 34, the rotor-core central portions 36, and the rotor-core attachment portion 11a. In other words, the rotor unit 30 is provided with the rotor-core space 37 defined by the recesses that are formed in the first rotor core 31A and the second rotor core 31B and that face each other. Owing to the rotor-core space 37, the weight of the rotor unit 30 is reduced. Therefore, the inertia of the rotor unit 30 is reduced and the efficiency of the motor is increased. With the above-described structure, a rotating electrical machine having a light structure suitable for increasing the size thereof in accordance with the increasing capacity can be provided.

Structure of Stator Unit 40

A stator unit 40 is provided so as to surround the rotor unit 30 with an air gap therebetween at the outer periphery of the rotor unit 30. The stator unit 40 includes a first stator core 41A and a second stator core 41B. The first stator core 41A and the second stator core 41B are arranged next to each other in the axial direction. The first stator core 41A and the second stator core 41B are fixed to an inner section of the frame 20.

A reinforcing plate 42 made of metal, such as steel or stainless steel, is provided between the first stator core 41A and the second stator core 41B so as to extend substantially parallel to the flange unit 12. With this structure, a rotating electrical machine having a high-rigidity structure suitable for increasing the size thereof in accordance with the increasing capacity can be provided.

The first stator core 41A, the second stator core 41B, and the reinforcing plate 42 are positioned with respect to each other by a pin 43 inserted therethrough, and are fixed to the frame 20. Thus, the rigidity of the stator unit 40 is increased.

The pin 43 is a single component, and extends through the first stator core 41A, the reinforcing plate 42, and the second stator core 41B from one end of the frame 20 to the other end of the frame 20 in the axial direction. Thus, the rigidity of the stator unit 40 is further increased.

Description of Detailed Shape of Reinforcing Plate

Figure 5A:
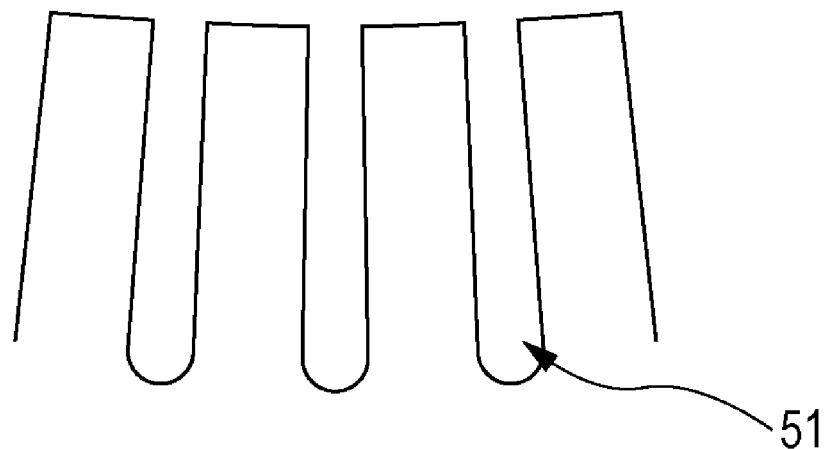
FIGS. 5A and 5B are sectional views of parts of a stator unit.
Figure 5B:
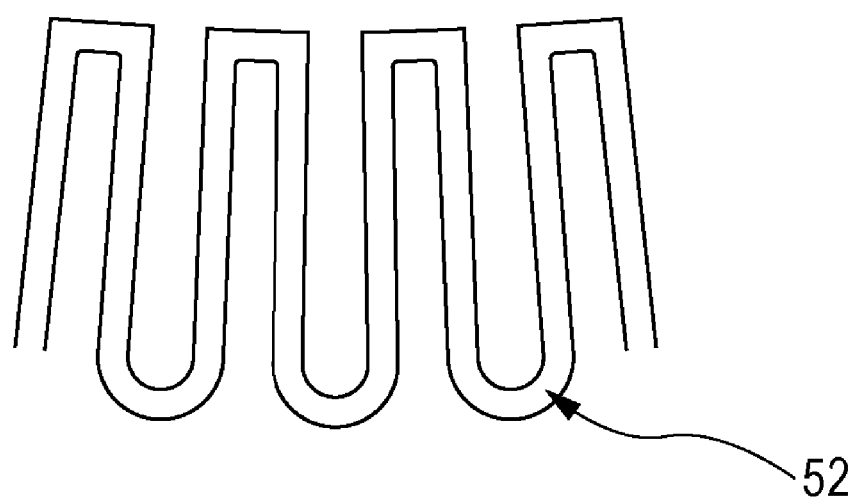

The detailed shape of the reinforcing plate 42 will now be described with reference to FIGS. 5A and 5B. FIGS. 5A and 5B are sectional views of the stator unit 40, where FIG. 5A is a sectional view of FIG. 4 taken along line VA-VA and FIG. 5B is a sectional view of FIG. 4 taken along line VB-VB. As illustrated in FIG. 5A, the first stator core 41A includes a plurality of teeth 51, and coils (not shown) are wound around the teeth 51. In addition, as illustrated in FIG. 5B, the reinforcing plate 42 includes a plurality of tongue portions 52 that have slightly larger width and height than those of the teeth 51 around which the coils are wound. Accordingly, deformation of the teeth 51 can be prevented and the coils can be easily inserted. With the above-described structure, a rotating electrical machine that can be easily manufactured can be provided.

Description of Reinforcing Structure Including Reinforcing Bars

Figure 6:
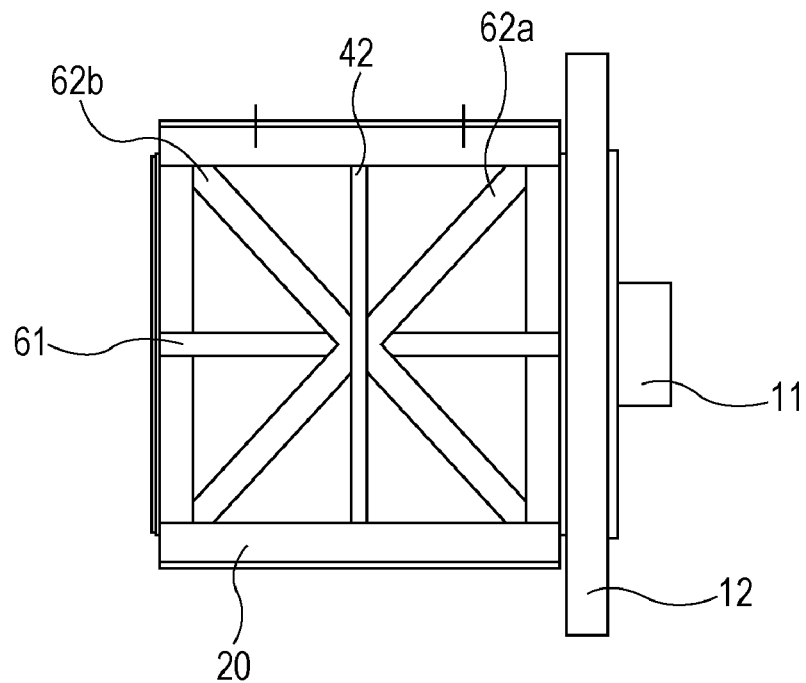
FIG. 6 is a side view of the rotating electrical machine in the state in which a cover is removed.

A reinforcing structure of the rotating electrical machine 10 including reinforcing bars will now be described with reference to FIG. 6. FIG. 6 is a side view of the rotating electrical machine 10 in the state in which the cover 14 is removed. The above-described reinforcing plate 42 is provided at a central section of the rotating electrical machine 10 in the axial direction. A reinforcing bar 61 is attached to the frame 20 at each of the opposite sides of the frame 20 in a plan view of the frame 20 as viewed in the axial direction of the shaft 11. The reinforcing bar 61 extends in a direction perpendicular to the reinforcing plate 42. In addition, reinforcing bars 62a and 62b are diagonally attached to the frame 20 in an inclined manner so as to intersect each other.

With this structure, a rotating electrical machine having a high-rigidity structure suitable for increasing the size thereof in accordance with the increasing capacity can be provided. More specifically, since the reinforcing structure including the above-described reinforcing bars is used, the frame 20 is strongly reinforced. As a result, even when the rotating electrical machine 10 is a motor having extremely large size and capacity, the rotating electrical machine 10 can be supported in a cantilever manner by fixing the flange unit 12 to the bracket B in a state such that the shaft 11 is substantially horizontal.

Cooling Operation Using Fans

Figure 7:
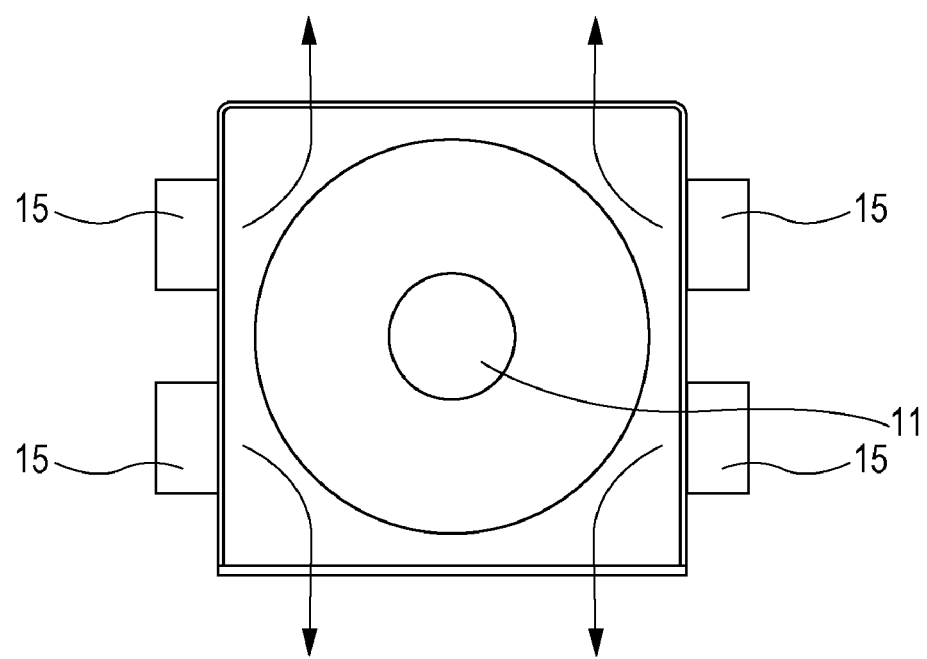
FIG. 7 is a schematic diagram illustrating a cooling operation performed by fans.

Next, a cooling operation using the fans 15 will be described with reference to FIG. 7. FIG. 7 is a schematic diagram illustrating the cooling operation performed by the fans 15. As illustrated in FIG. 7, rotation directions of the fans 15 are set such that air blows into the rotating electrical machine 10. The fans 15 are disposed symmetrically to each other with respect to the axial line of the rotor unit 30. The air from the fans 15 at an upper section (at one side of the axial line) hits the stator unit 40 and absorbs heat from the stator unit 40. Then, the air is reflected by the stator unit 40 and is discharged from the top of the rotating electrical machine 10. The air from the fans 15 at a lower section (at the other side of the axial line) hits the stator unit 40 and absorbs heat from the stator unit 40. Then, the air is reflected by the stator unit 40 and is discharged from the bottom of the rotating electrical machine 10. The rotating electrical machine 10 is fixed to the bracket B in a cantilever manner with the flange unit 12 provided therebetween, and no obstacle is placed above or below the rotating electrical machine 10. Therefore, the cooling air that hits the stator unit 40 smoothly flows out of the rotating electrical machine 10. Therefore, the rotating electrical machine 10 with an extremely high output that generates high-temperature heat can be effectively cooled. With this structure, a rotating electrical machine having a structure for effectively dissipating the generated heat that increases with the increasing capacity can be provided.

The fans 15 are fixed to the frame 20 or the reinforcing bars 62a and 62b. In the case where the fans 15 are provided on the reinforcing bars 62a and 62b, the air from the fans 15 hits the reinforcing bars 62a and 62b and is diffused, so that the cooling efficiency can be increased.

As described above, the rotating electrical machine 10 according to the present embodiment includes the reinforcing plate 42 and the reinforcing bars 62a and 62b in the frame unit, so that the rotating electrical machine 10 can be supported in a cantilever manner using the flange unit. In addition, the cooling effect can be further increased by placing the fans 15 at appropriate positions. In the case where the fans 15 are provided on the side surfaces of the frame 20, the fans 15 function as reinforcing members for reinforcing the side surfaces of the frame 20. Therefore, the rigidity of the frame 20 can be further increased.

An embodiment of the present invention has been described above. However, it is apparent to those skilled in the art that various alterations can be made to the embodiment, and such alterations are also within the technical scope of the present invention.

Description of Rotor Skew

Figure 8A:
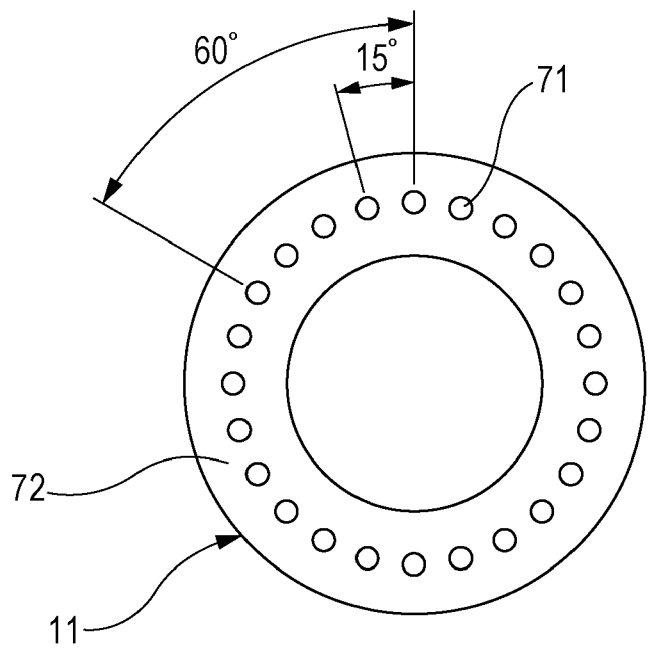
FIGS. 8A and 8B are schematic diagrams illustrating skewing of a rotor unit.
Figure 8B:
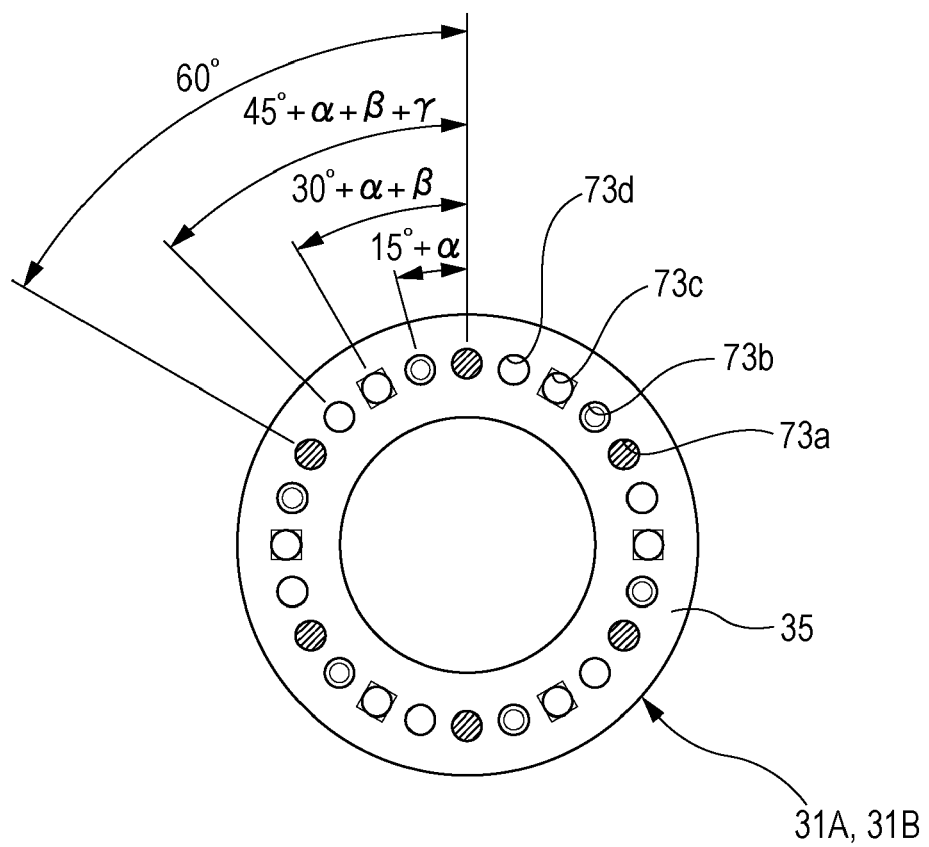

For example, in the above-described embodiment, the rotor unit 30 is not skewed. However, the rotor unit 30 may be skewed. Skewing of the rotor unit 30 will now be described with reference to FIGS. 8A and 8B. FIGS. 8A and 8B are schematic diagrams illustrating skewing of the rotor unit 30.

FIG. 8A illustrates a rotor-core attachment surface 72, and FIG. 8B illustrates a rotor-core inner peripheral portion 35. The rotor-core attachment surface 72 is either of the rotor-core attachment surfaces 11b and 11c, and has internal thread portions 71 formed therein. The internal thread portions 71 are arranged along a circumference at a constant pitch (at 24 positions in FIG. 8A). Bolt insertion holes (first holes 73a), the number of which corresponds to the number of bolts necessary for providing torque resistance, are formed in the rotor-core inner peripheral portion 35. The first holes 73a are arranged along a circumference at a constant pitch (at 6 positions in FIG. 8B). Additional bolt insertion holes (second holes 73b, third holes 73c, and fourth holes 73d), the number of which corresponds to the number of bolts necessary for providing torque resistance, are also formed in the rotor-core inner peripheral portion 35. The second holes 73b, the third holes 73c, and the fourth holes 73d are arranged at a constant pitch at positions shifted from the first holes 73a by predetermined angles ($\alpha$, $\beta$, and $\gamma$). With this structure, the rotor unit 30 can be skewed with relatively large freedom. In the case where each of the first rotor core 31A and the second rotor core 31B has the above-described structure, the rotor unit 30 can be skewed at an angle other than the predetermined angles ($\alpha$, $\beta$, $\gamma$), for example, at ($\alpha-\beta$) or ($\alpha+\beta$). When the rotor unit 30 is skewed, cogging thrust can be reduced and smooth control can be achieved.

In the above-described embodiment, the fans 15 are attached to the cover 14 or the frame 20. However, the fans 15 may instead be attached to the inclined reinforcing bars 62a and 62b. In such a case, the fans 15 function as structural components and the rigidity of the frame 20 can be increased. In addition, when the inclined reinforcing bars 62a and 62b are positioned at the centers of the fans 15, the cooling air is evenly divided so as to flow along both sides of each of the reinforcing bars 62a and 62b. Therefore, the reinforcing efficiency can be further increased.

The rotating electrical machine 10 is not limited to a motor, and may instead be a generator.

In addition to the above-described examples, methods of the above-described embodiment and modifications may be used in combination as appropriate.

Obviously, numerous modifications and variations of the present invention are possible in light of the above teachings. It is therefore to be understood that within the scope of the appended claims, the invention may be practiced otherwise than as specifically described herein.

What is claimed as new and is desired to be secured by Letters Patent of the United States is:

1. A rotating electrical machine comprising:
a stator including an inner peripheral surface; and
a rotor provided to be surrounded by the stator and to be rotatable relative to the stator about a rotational axis, the rotor comprising:
a shaft rotatable relative to the stator about the rotational axis;
a first rotor core connected to the shaft to be rotatable together with the shaft, the first rotor core including a first base portion and a first outer peripheral portion, the first base portion being provided on an outer peripheral surface of the shaft, the first outer peripheral portion being provided on an outer peripheral surface of the first base portion and facing the inner peripheral surface of the stator in a radial direction of the rotor, a maximum length of the first base portion in an axial direction along the rotational axis being shorter than a maximum length of the first outer peripheral portion in the axial direction; and
a second rotor core arranged next to the first rotor core in the axial direction and connected to the shaft to be rotatable together with the shaft, the second rotor core including a second base portion and a second outer peripheral portion, the second base portion being provided on the outer peripheral surface of the shaft, the second outer peripheral portion being provided on an outer peripheral surface of the second base portion and facing the inner peripheral surface of the stator in the radial direction, a maximum length of the second base portion in the axial direction being shorter than a maximum length of the second outer peripheral portion in the axial direction.

2. The rotating electrical machine according to claim 1, wherein a rotor-core space is defined by first and second base portions and first and second outer peripheral portions and is provided between the first base portion and the second base portion in the axial direction.

3. The rotating electrical machine according to claim 2, further comprising:
a hollow frame including an inner surface to which the stator is connected,
wherein the stator includes
a first stator core provided radially outward of the first outer peripheral portion of the first rotor core,
a second stator core provided radially outward of the second outer peripheral portion of the second rotor core and arranged next to the first stator core in the axial direction, and
a reinforcing plate disposed between the first stator core and the second stator core to reinforce the hollow frame.

4. The rotating electrical machine according to claim 3, further comprising:
a flange provided at one end of the hollow frame in the axial direction;
a plurality of first reinforcing bars intersecting each other and provided on a first side surface of the hollow frame; and
a plurality of second reinforcing bars intersecting each other and provided on a second side surface of the hollow frame, the second side surface being opposite to the first side surface with respect to the hollow frame when viewed from the axial direction,
wherein the flange has a substantially rectangular shape.

5. The rotating electrical machine according to claim 1, wherein the first base portion is spaced apart from the second base portion in the axial direction.

6. The rotating electrical machine according to claim 5, wherein the first outer peripheral portion is spaced apart from the second outer peripheral portion in the axial direction.

7. The rotating electrical machine according to claim 6,
wherein the rotor further comprises a rotor-core space defined by the shaft, the first base portion, the first outer peripheral portion, the second base portion, and the second outer peripheral portion,
wherein the rotor-core space is provided between the first base portion and the second base portion in the axial direction, and
wherein a minimum distance between the first and second base portions in the axial direction is longer than a minimum distance between the first and second outer peripheral portions in the axial direction.

8. The rotating electrical machine according to claim 1,
wherein the shaft includes a shaft main-body and a rotor-core attachment portion protruding radially outward from an outer peripheral surface of the shaft main-body, the rotor-core attachment portion including a first end surface and a second end surface, the second end surface being opposite to the first end surface in the axial direction, wherein the first base portion is in contact with the first end surface of the rotor-core attachment portion and is connected to the rotor-core attachment portion, and wherein the second base portion is in contact with the second axial side of the rotor-core attachment portion and is connected to the rotor-core attachment portion.

9. The rotating electrical machine according to claim 1, wherein the first base portion includes a first inner peripheral portion and a first central portion, wherein the first inner peripheral portion is provided on the outer peripheral surface of the shaft and extends radially outward from the outer peripheral surface of the shaft, and wherein the first central portion is provided on an outer peripheral surface of the first inner peripheral portion and connects the first inner peripheral portion to the first outer peripheral portion.

10. The rotating electrical machine according to claim 9, wherein the second base portion includes a second inner peripheral portion and a second central portion, wherein the second inner peripheral portion is provided on the outer peripheral surface of the shaft and extends radially outward from the outer peripheral surface of the shaft, and wherein the second central portion is provided on an outer peripheral surface of the second inner peripheral portion and connects the second inner peripheral portion to the second outer peripheral portion.

11. The rotating electrical machine according to claim 10, wherein a minimum distance between the first inner peripheral portion and the second inner peripheral portion in the axial direction is longer than a minimum distance between the first outer peripheral portion and the second outer peripheral portion in the axial direction.

12. The rotating electrical machine according to claim 11, wherein a minimum distance between the first central portion and the second central portion in the axial direction is longer than a minimum distance between the first inner peripheral portion and the second inner peripheral portion in the axial direction.

13. The rotating electrical machine according to claim 10, wherein a maximum length of the first outer peripheral portion in the axial direction is longer than a maximum length of the first central portion in the axial direction, and is shorter than a maximum length of the first outer peripheral portion in the axial direction.

14. The rotating electrical machine according to claim 13, wherein a maximum length of the second outer peripheral portion in the axial direction is longer than a maximum length of the second central portion in the axial direction, and is shorter than a maximum length of the second outer peripheral portion in the axial direction.

15. The rotating electrical machine according to claim 10, wherein the first outer peripheral portion protrudes from an outer peripheral end of the first central portion to both sides of the axial direction, and wherein the second outer peripheral portion protrudes from an outer peripheral end of the second central portion to both sides of the axial direction.

\* \* \* \* \*